US012621046B2

(12) United States Patent
Rasoulian et al.

(10) Patent No.: US 12,621,046 B2
(45) Date of Patent: May 5, 2026

(54) INTEGRATED MOBILITY TERMINAL FOR SATELLITE COMMUNICATIONS

(71) Applicant: Hughes Network Systems, LLC, Germantown, MD (US)

(72) Inventors: Reza Rasoulian, Germantown, MD (US); John Schmid, Darnestown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 669 days.

(21) Appl. No.: 18/060,217

(22) Filed: Nov. 30, 2022

(65) Prior Publication Data

US 2023/0179290 A1 Jun. 8, 2023

Related U.S. Application Data

(60) Provisional application No. 63/264,937, filed on Dec. 3, 2021.

(51) Int. Cl.
*H04B 7/185* (2006.01)
(52) U.S. Cl.
CPC ..... *H04B 7/18513* (2013.01); *H04B 7/18519* (2013.01)
(58) Field of Classification Search
CPC ............ H04B 7/18513; H04B 7/18539; H04B 7/185; H04B 7/0617; H04B 7/18519
See application file for complete search history.

(56) References Cited

U.S. PATENT DOCUMENTS

| | | | |
|---|---|---|---|
| 7,009,558 B1* | 3/2006 | Fall | H01Q 3/08 |
| | | | 342/359 |
| 10,574,341 B1 | 2/2020 | Liang et al. | |
| 2012/0249366 A1 | 10/2012 | Pozgay et al. | |
| 2015/0011159 A1 | 1/2015 | Marinov et al. | |
| 2015/0355334 A1* | 12/2015 | Stubbs | G01S 19/14 |
| | | | 342/357.395 |
| 2017/0085314 A1* | 3/2017 | Davis | G01S 19/42 |

FOREIGN PATENT DOCUMENTS

| | | |
|---|---|---|
| CN | 111130627 A | 5/2020 |
| WO | 2021096812 A1 | 5/2021 |

OTHER PUBLICATIONS (CN 202395773 U), Qie et al., 0.3m Portable Satellite Earth Station Based On Automatic Satellite Pointing, Aug. 2012, pp. 1-6 ( Year: 2012).*
(WO 2005015807 A2), Casperson et al., Realtime Electronic Communications System and Method, Feb. 2005, pp. 1-3 (Year: 2005).*

* cited by examiner

*Primary Examiner* — Keith Ferguson
(74) *Attorney, Agent, or Firm* — Capitol City TechLaw; Jasbir Singh

(57) ABSTRACT

An integrated mobility terminal may include a modem to modulate/demodulate digital data to an intermediate frequency (IF) signal; an RF Conversion Module (RCM) to communicate between the IF signal a Radio Frequency (RF) signal for satellite communications; a Beam Forming Array (BFA) to transceive the RF signal and a Common Control Module (CCM) to manage the modem, the RCM and the BFA. The integrated mobility terminal may include a chassis to house the modem, the RCM, the BFA and the CCM, wherein the chassis is of an integrated-unitary construction.

20 Claims, 2 Drawing Sheets

INTEGRATED MOBILITY TERMINAL FOR SATELLITE COMMUNICATIONS

CROSS-REFERENCE TO RELATED APPLICATIONS AND INCORPORATION BY REFERENCE

The present application claims the benefit under 35 U.S.C. 119(e) of U.S. Provisional Application Ser. No. 63/264,937 filed Dec. 3, 2021, which is incorporated herein by reference in its entirety.

FIELD

An integrated mobility terminal for satellite communications provides data communications to end users on a mobile platform. The mobile platform includes aeronautical, maritime and land mobile vehicles.

BACKGROUND

The prior technology implementations include multiple Line Replaceable Units (LRUs) necessitating a larger Size, Weight, and Power consumption (SWaP) in the mobile platform. The larger size of the multiple LRUs can degrade the performance of the mobile platform due to aerodynamic drag and SWaP. For example, in the aeronautical application, the prior technology is based on the ARINC 791/792 industry standards specifying that the mobility terminal is to be implemented as multiple Line Replaceable Units (LRUs) that are separately installed on the aircraft. This results in more physical space, weight and power consumption. Moreover, some of the multiple LRUs of the prior art include climate control environments that can further tax the mobile platform.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An integrated mobility terminal enables the placement on mobile platforms where prior technology placement would not be possible. The integrated mobility terminal is integrated into a single LRU. The LRU integrates satellite components to support a mobility application, for example, a satellite modem, a Radio Frequency (RF) transceiver, an antenna aperture, a Beam Forming Array (BFA), a terminal control manager, position sensors, attitude sensors and power supply conditioning into a single LRU.

By eliminating multiple enclosures, while integrating mobility terminal functionality, a single LRU significantly reduces the integrated mobility terminal's size and weight. For example, the single LRU eliminates interface components between the multiple LRUs. Furthermore, by integrating functions into a single LRU results in a significant reduction in power consumption and climate control.

In some aspects, the techniques described herein relate to an integrated mobility terminal including: a modem to modulate/demodulate digital data to an intermediate frequency (IF) signal; an RF Conversion Module (RCM) to communicate between the IF signal a Radio Frequency (RF) signal for satellite communications; a Beam Forming Array (BFA) to transceive the RF signal; a Common Control Module (CCM) to manage the modem, the RCM and the BFA; and a chassis to house the modem, the RCM, the BFA and the CCM, wherein the chassis is of an integrated-unitary construction.

In some aspects, the techniques described herein relate to an integrated mobility terminal, further including a power supply unit.

In some aspects, the techniques described herein relate to an integrated mobility terminal, further including a Global Navigation Satellite System (GNSS) to provide a geographic location of the integrated mobility terminal.

In some aspects, the techniques described herein relate to an integrated mobility terminal, wherein the GNSS includes a Global Positioning System (GPS) providing time, frequency and geographic location information.

In some aspects, the techniques described herein relate to an integrated mobility terminal, further including an Attitude Heading Reference System (AHRS), wherein the AHRS provides roll, pitch and yaw measurements needed to properly point the BFA to a satellite.

In some aspects, the techniques described herein relate to an integrated mobility terminal, wherein the AHRS is self-aligning and a disposition of the integrated mobility terminal on a mobile platform is agnostic as to an attitude of the mobile platform.

In some aspects, the techniques described herein relate to an integrated mobility terminal, further including a data port configured to communicate via digital packets.

In some aspects, the techniques described herein relate to an integrated mobility terminal, further including an ethernet port configured to communicate via digital packets.

In some aspects, the techniques described herein relate to an integrated mobility terminal, further including a radome forming an exterior wall of the integrated mobility terminal, wherein the radome is disposed above the BFA.

In some aspects, the techniques described herein relate to an integrated mobility terminal, further including a polarizer disposed above the BFA.

In some aspects, the techniques described herein relate to an integrated mobility terminal, wherein the BFA has an operational range including 10.7 to 12.7 GHz for reception, the BFA has an operational range including 14 to 14.5 GHz for transmission, the BFA has a field of view from 45 to 90 degrees elevation and 360 degrees in azimuth.

In some aspects, the techniques described herein relate to an integrated mobility terminal, further including an AHRS and a GNSS.

In some aspects, the techniques described herein relate to an integrated mobility terminal including: a modem to modulate/demodulate digital data to an intermediate frequency (IF) signal; an RF Conversion Module (RCM) to communicate between the IF signal a Radio Frequency (RF) signal for satellite communications; a Beam Forming Array (BFA) to transceive the RF signal; a Common Control Module (CCM) to manage the modem, the RCM and the BFA; and an Attitude Heading Reference System (AHRS), wherein the AHRS provides roll, pitch and yaw measurements needed to properly point the BFA to a satellite, wherein the AHRS is self-aligning and a disposition of the integrated mobility terminal on a mobile platform is agnostic as to an attitude of the mobile platform.

In some aspects, the techniques described herein relate to an integrated mobility terminal, further including a power supply unit.

In some aspects, the techniques described herein relate to an integrated mobility terminal, further including a Global Navigation Satellite System (GNSS) to provide a geographic location of the integrated mobility terminal.

In some aspects, the techniques described herein relate to an integrated mobility terminal, further including a data port configured to communicate via digital packets.

In some aspects, the techniques described herein relate to an integrated mobility terminal, further including a radome forming an exterior wall of the integrated mobility terminal, wherein the radome is disposed above the BFA.

In some aspects, the techniques described herein relate to an integrated mobility terminal, further including a polarizer disposed above the BFA.

In some aspects, the techniques described herein relate to an integrated mobility terminal, wherein the BFA has an operational range including 10.7 to 12.7 GHz for reception, the BFA has an operational range including 14 to 14.5 GHz for transmission, the BFA has a field of view from 45 to 90 degrees elevation and 360 degrees in azimuth.

In some aspects, the techniques described herein relate to an integrated mobility terminal, wherein the chassis is of an integrated-unitary construction.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figures 1, 2:
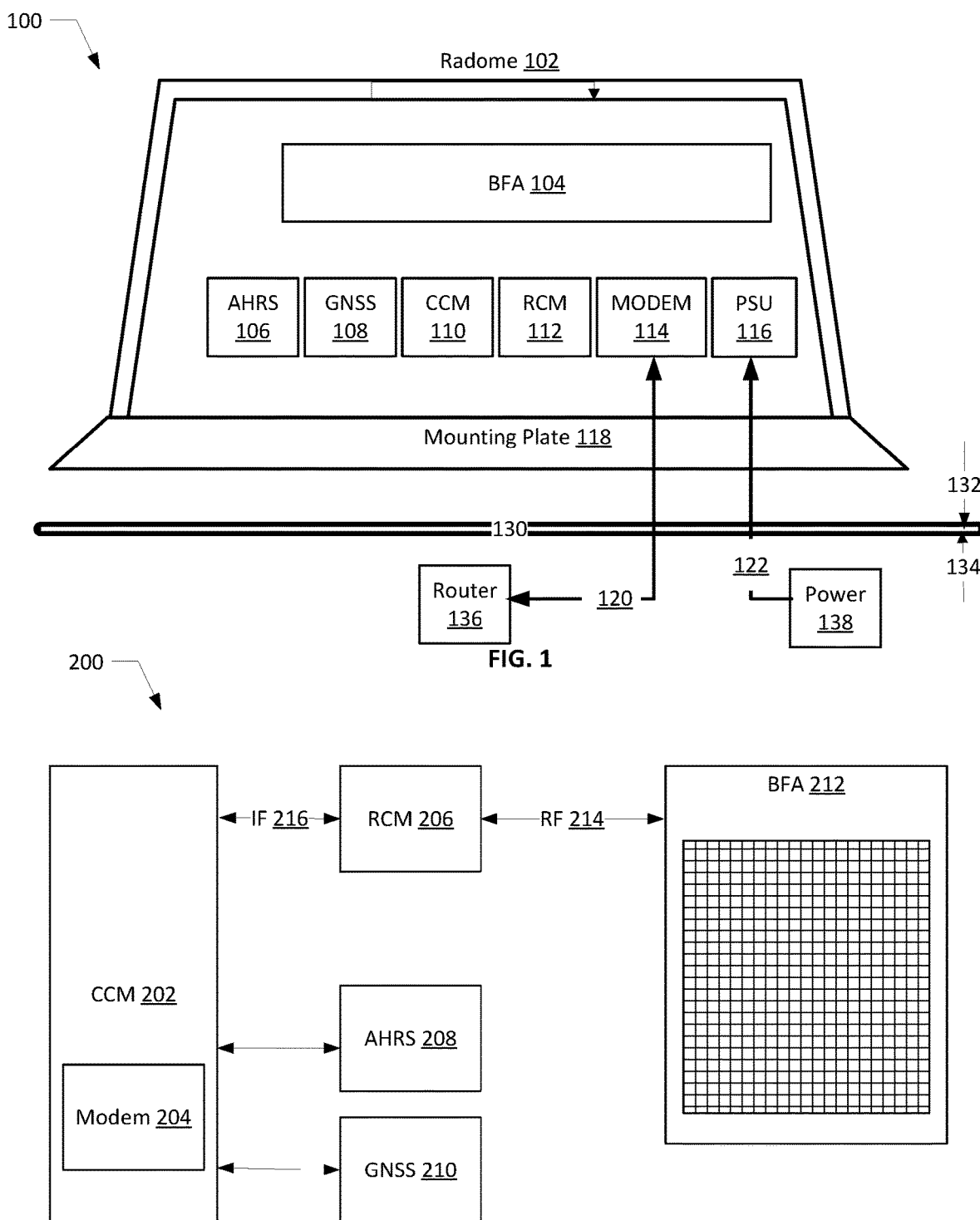
FIG. 1 illustrates an integrated mobility terminal disposed on an outer surface of a platform according to various embodiments.
FIG. 2 illustrates a block diagram of an integrated mobility terminal according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

A single LRU greatly simplifies the installation process. The single LRU operates using, for example, one power input and one or more user data interfaces. The user data interfaces may be selected from standardized interfaces, such as Ethernet or optical fiber. By eliminating the interconnections between multiple LRUs installation is simplified. In some embodiments, control and data communications may use the same interface, such as, an Ethernet interface. In some embodiments, the control and data communications may use discrete interfaces, possibly of the same type.

A compact integrated mobility terminal for use with satellite data communications systems on mobile platforms such as, aeronautical, maritime and land vehicles is disclosed. The satellite system can be Geosynchronous (GEO), Medium Earth Orbit (MEO) or Low Earth Orbit (LEO) or a combination of the three.

The integrated mobility terminal may be of an integrated unitary construction, for example, as an assembled package ready to be mounted to the mobile platform. The mounting may or may not use a mounting (adapter) plate. The integrated mobility terminal may support mechanical mounting. The integrated mobility terminal may have thermal management features.

The integrated mobility terminal may be used with a radome. The radome may be part of the integrated mobility terminal or provided separately. The radome protects against the environment, birds or direct lightning strikes. Operation of the integrated mobility terminal is independent of connecting to or accessing a mobile platform's navigation data, for example, aircraft navigation data per ARINC A429.

In exemplary embodiments, the integrated mobility terminal may operate as a receiver for RF signals ranging from 10.7 to 12.7 GHz. In exemplary embodiments, the integrated mobility terminal may operate as a transmitter for RF signals ranging from 14 to 14.5 GHz. The integrated mobility terminal may have a field of view ranging from 45 to 90 degrees in elevation and 360 degrees across the azimuth. The integrated mobility terminal may support simplex, duplex or half-duplex communications. In exemplary embodiments, the integrated mobility terminal may operate in half-duplex mode with a switching time of less than 5 milliseconds, less than 1 millisecond or the like. In exemplary embodiments, the integrated mobility terminal may provide a forward data rate (from gateway to mobility terminal) of 50 Mbps with a peak rate of 70 Mbps. In exemplary embodiments, the integrated mobility terminal may provide a return data rate (from gateway to mobility terminal of 5 Mbps with a peak rate 10 Mbps.

In some embodiments, the integrated mobility terminal may have height of less than 6 inches, less than 2 inches, or the like. In some embodiments, the integrated mobility terminal may have width of less than 2 feet, less than 14 inches, less than 1 foot, less than 7 inches, or the like. In some embodiments, the integrated mobility terminal may have length of less than 3 feet, less than 2 feet, less than 1 foot or the like.

FIG. 1 illustrates an integrated mobility terminal disposed on an outer surface of a platform according to various embodiments.

An integrated mobility terminal 100 is integrated into a single LRU. The integrated mobility terminal 100 may provide a low profile such that it does not produce any significant wind load drag on the mobile platform while in motion. The integrated mobility terminal 100 may be a compact totally integrated unit. The integrated mobility terminal 100 may be a single Line Replaceable Unit (LRU). The integrated mobility terminal 100 integrates various satellite terminal functions to support a mobility application.

The integrated mobility terminal 100 may include a radome 102 to protect the terminal circuitry and components from the outside environment including water ingress, lightning protection, and protection against corrosion.

The integrated mobility terminal 100 may include a Beam Forming Array (BFA) 104 that may be implemented as a low-profile flat panel antenna aperture to provide the Beam Forming Array. The BFA may enable communication with a satellite by tracking the mobile platform and/or satellite motion. The BFA 104 may include a low-profile flat panel Electrically Steerable Antenna (ESA). The BFA 104 may operate in the Ku band. The BFA 104 may operate in the Ka band. The BFA 104 may include a circular polarizer. The circular polarizer may be switchable.

The integrated mobility terminal 100 may include an Attitude Heading Reference System (AHRS) 106 for use in antenna pointing. The AHRS 106 may provide roll, pitch, and yaw reference and orientation information of the integrated mobility terminal 100 (as opposed to the attitude of the mobile platform) to a targeted satellite (not shown). In some embodiments, the mobility terminal may be self-aligning, and the attitude determination does not include additional attitude data nor precision alignment of the BFA 104 to the mobile platform.

The integrated mobility terminal 100 may include a GNSS 108, such as, the Global Positioning System (GPS), to provide the geographical position of the integrated mobility terminal 100. The geographical position may be used to select the targeted satellite (based on ephemeris data for example) and to accurately track the targeted satellite with the BFA 104. In some embodiments, the geographic location determination of the integrated mobility terminal 100 does not include additional navigation data nor precision alignment to the mobile platform. The integrated mobility terminal 100 may intermittently determine its geographic location and orientation using the GNSS 108. The integrated mobility terminal 100 may integrate the GNSS 108 and the AHRS 106 therein, for example, in the BFA 104. The GNSS 108 may provide position, time and frequency reference information.

The integrated mobility terminal 100 may include a Common Control Module (CCM) 110 to provide the overall control and monitoring functions. The CCM 110 may provide both local and remote network management functions including fault management, configuration, authentication, performance monitoring and access security. The CCM 110 may include a modem 114. The CCM 110 may include a control processor. The prior art fails to integrate the terminal manager into a single terminal LRU and includes external components to provide any management or control functions.

The integrated mobility terminal 100 may include an RF conversion module (RCM) 112 to provide frequency conversion and amplification of the modem modulated signals to frequencies that are compatible with satellite systems including but not limited to the Ku and Ka frequency bands. The RCM 112 may be included in a satellite band RF transceiver. This prior art fails to integrate the RCM into a signal terminal LRU and includes external components to provide the RF transceiver.

The integrated mobility terminal 100 may include a modem 114 to provide the modulation and demodulation of the user data received via a data port 120 into signals that can be communicated over the satellite system. In satellite system communications, baseband data is modulated and demodulated into signals using the modem, which signals can be transmitted and received over the air. In some embodiments, the data port 120 communicates digital data, for example, data packets such as Internet Protocol (IP) packets. The prior art fails to integrate the modem functions into a single terminal LRU and includes external communication equipment.

The integrated mobility terminal 100 may include a Power Supply Unit (PSU) 116 to accept power either as AC or DC via power port 122 and convert into the voltages for the satellite terminal circuitry. The power available on a mobile platform may be limited. A single LRU enables the operation of the satellite terminal where prior technology would not be possible. The inoperability of the prior art technology may be due to environment controls for some of the multiple LRUs (heat dissipation or the like). For example, for some components of a multiple LRU mobility terminal, significant heat dissipation adversely affects the performance of the satellite terminal.

The integrated mobility terminal 100 may include a mounting plate 118. The mounting plate 118 may be affixed to a substrate 130 of a mobile platform (not shown) having an outer surface 132 and an inner surface 134. The integrated mobility terminal 100 may be affixed to the outer surface 132 with the radome 102 being oriented away from the mobile platform.

In some embodiments, the integrated mobility terminal 100 may be disposed as outside aircraft equipment. In some embodiments, the integrated mobility terminal 100 may connect to inside aircraft equipment. Exemplary inside equipment may include a network router 136 connected to the integrated mobility terminal 100 via the data port 120, for example, a GigE LAN. Exemplary inside equipment may include a platform power 138 connected to the integrated mobility terminal 100 via the power port 122. The platform power 138 may provide a power holdup, for example, of 200 milliseconds. The platform power 138 may supply DC power at about 12 Volts, at about 28 Volts, at about 50 Volts or the like. The platform power 138 may supply AC power at about 120 Volts, at about 240 Volts, at about 480 Volts or the like.

FIG. 2 illustrates a block diagram of an integrated mobility terminal according to various embodiments.

An integrated mobility terminal 200 may include a Common Control Module (CCM) 202 including a modem 204. The modem 204 may modulate/demodulate signals at an Intermediate Frequency (IF). The integrated mobility terminal 200 may include a RF Conversion Module (RCM) 206. The RCM 206 may include an IF to satellite frequency band (such as Ku or Ka band) transceiver. The CCM 202 may communicate the IF signals between the modem 204 and the RCM 206 via an IF line 216. The RCM 206 may convert between the IF signals and Radio Frequency (RF) signals communicated with a satellite (not shown) via an RF line 214. The integrated mobility terminal 200 may include an AHRS 208. The integrated mobility terminal 200 may include an GNSS 210. The integrated mobility terminal 200 may include a BFA 212.

Figures 3, 4:
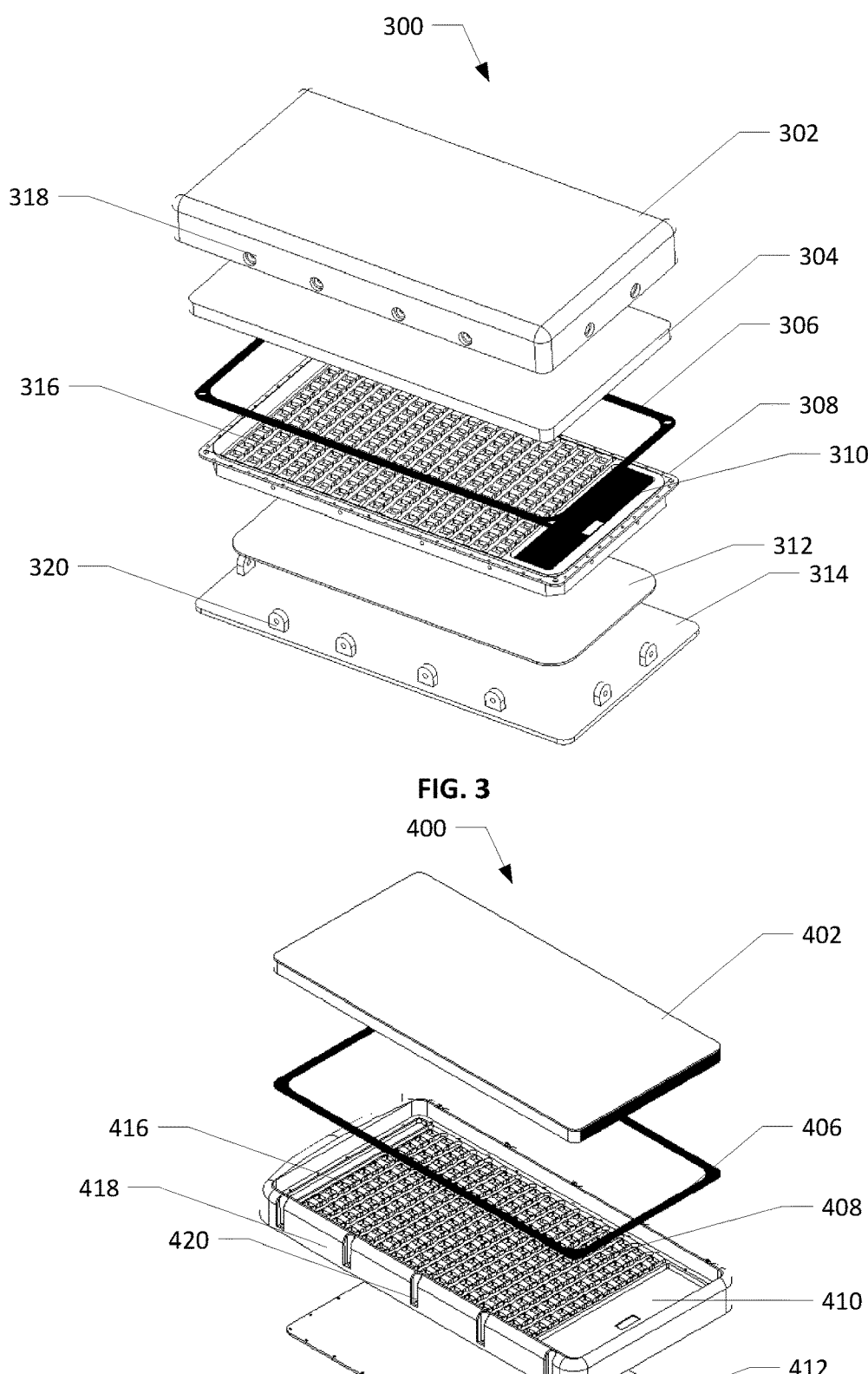
FIG. 3 illustrates an integrated mobility terminal according to various embodiments.
FIG. 4 illustrates an integrated mobility terminal according to various embodiments.

FIG. 3 illustrates an integrated mobility terminal according to various embodiments.

An integrated mobility terminal 300 may include a radome 302, a polarizer 304, a polarizer gasket 306, a chassis 308, a chassis baseplate 312 and a baseplate 314. The chassis 308 may include a beam forming array 316 and a CCM 310. The radome 302 may form an exterior wall of the integrated mobility terminal 300. The chassis baseplate 312 may form an exterior wall of the integrated mobility terminal 300. The radome 302 may include screw holes 318 corresponding to nuts 320 included in the baseplate 314. The integrated mobility terminal 300 may be disposed on the mobile platform (not shown) affixing the screw holes 318 to the nuts 320.

FIG. 4 illustrates an integrated mobility terminal according to various embodiments.

An integrated mobility terminal 400 may include a radome 402, a polarizer gasket 406, a chassis 408, and a chassis baseplate 412. The chassis 408 may include a sidewall 418, a beam forming array 416 and a CCM 410. The radome 402 may form an exterior wall of the integrated mobility terminal 400. The chassis baseplate 412 may form an exterior wall of the integrated mobility terminal 400. The sidewall 418 of the chassis 408 may form an exterior wall of the integrated mobility terminal 400. The sidewall 418 may include vertical mounting holes 420. The integrated mobility terminal 300 may be disposed on the mobile platform (not shown) using the vertical mounting holes 420 along the sidewall 418.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents define the invention, rather than any specific examples given.

We claim:

1. An integrated mobility terminal comprising:
a modem to modulate/demodulate digital data to an intermediate frequency (IF) signal;
an RF Conversion Module (RCM) to communicate between the IF signal a Radio Frequency (RF) signal for satellite communications;
a Beam Forming Array (BFA) to transceive the RF signal, wherein the BFA comprises an electrically steerable antenna to track the RF signal;
a Common Control Module (CCM) to manage the modem, the RCM and the BFA; and
a chassis to house the modem, the RCM, the BFA and the CCM,
wherein the chassis is of an integrated-unitary construction disposed in an outside environment of an aircraft.

2. The integrated mobility terminal of claim 1, further comprising a power supply unit.

3. The integrated mobility terminal of claim 1, further comprising a Global Navigation Satellite System (GNSS) to provide a geographic location of the integrated mobility terminal.

4. The integrated mobility terminal of claim 3, wherein the GNSS comprises a Global Positioning System (GPS) providing time, frequency and geographic location information.

5. The integrated mobility terminal of claim 1, further comprising an Attitude Heading Reference System (AHRS), wherein the AHRS provides roll, pitch and yaw measurements needed to properly point the BFA to a satellite.

6. The integrated mobility terminal of claim 5, wherein the AHRS is self-aligning and a disposition of the integrated mobility terminal on the aircraft is agnostic as to an attitude of the aircraft.

7. The integrated mobility terminal of claim 1, further comprising a data port configured to communicate via digital packets.

8. The integrated mobility terminal of claim 1, further comprising an ethernet port configured to communicate via digital packets.

9. The integrated mobility terminal of claim 1, further comprising a radome forming an exterior wall of the integrated mobility terminal, wherein the radome is disposed above the BFA.

10. The integrated mobility terminal of claim 1, further comprising a polarizer disposed above the BFA.

11. The integrated mobility terminal of claim 1, wherein the BFA has an operational range including 10.7 to 12.7 GHz for reception, the BFA has an operational range including 14 to 14.5 GHz for transmission, the BFA has a field of view from 45 to 90 degrees elevation and 360 degrees in azimuth.

12. The integrated mobility terminal of claim 11, further comprising an AHRS and a GNSS.

13. An integrated mobility terminal comprising:
a modem to modulate/demodulate digital data to an intermediate frequency (IF) signal;
an RF Conversion Module (RCM) to communicate between the IF signal a Radio Frequency (RF) signal for satellite communications;
a Beam Forming Array (BFA) to transceive the RF signal, wherein the BFA comprises an electrically steerable antenna to track the RF signal:
a Common Control Module (CCM) to manage the modem, the RCM and the BFA; and
an Attitude Heading Reference System (AHRS), wherein the AHRS provides roll, pitch and yaw measurements needed to properly point the BFA to a satellite,
wherein the AHRS is self-aligning and a disposition of the integrated mobility terminal on an outside environment of an aircraft is agnostic as to an attitude of the aircraft.

14. The integrated mobility terminal of claim 13, further comprising a power supply unit.

15. The integrated mobility terminal of claim 13, further comprising a Global Navigation Satellite System (GNSS) to provide a geographic location of the integrated mobility terminal.

16. The integrated mobility terminal of claim 13, further comprising a data port configured to communicate via digital packets.

17. The integrated mobility terminal of claim 13, further comprising a radome forming an exterior wall of the integrated mobility terminal, wherein the radome is disposed above the BFA.

18. The integrated mobility terminal of claim 13, further comprising a polarizer disposed above the BFA.

19. The integrated mobility terminal of claim 13, wherein the BFA has an operational range including 10.7 to 12.7 GHz for reception, the BFA has an operational range including 14 to 14.5 GHz for transmission, the BFA has a field of view from 45 to 90 degrees elevation and 360 degrees in azimuth.

20. The integrated mobility terminal of claim 13, wherein the chassis is of an integrated-unitary construction.

* * * * *